United States Patent Office 3,470,769
Patented Oct. 7, 1969

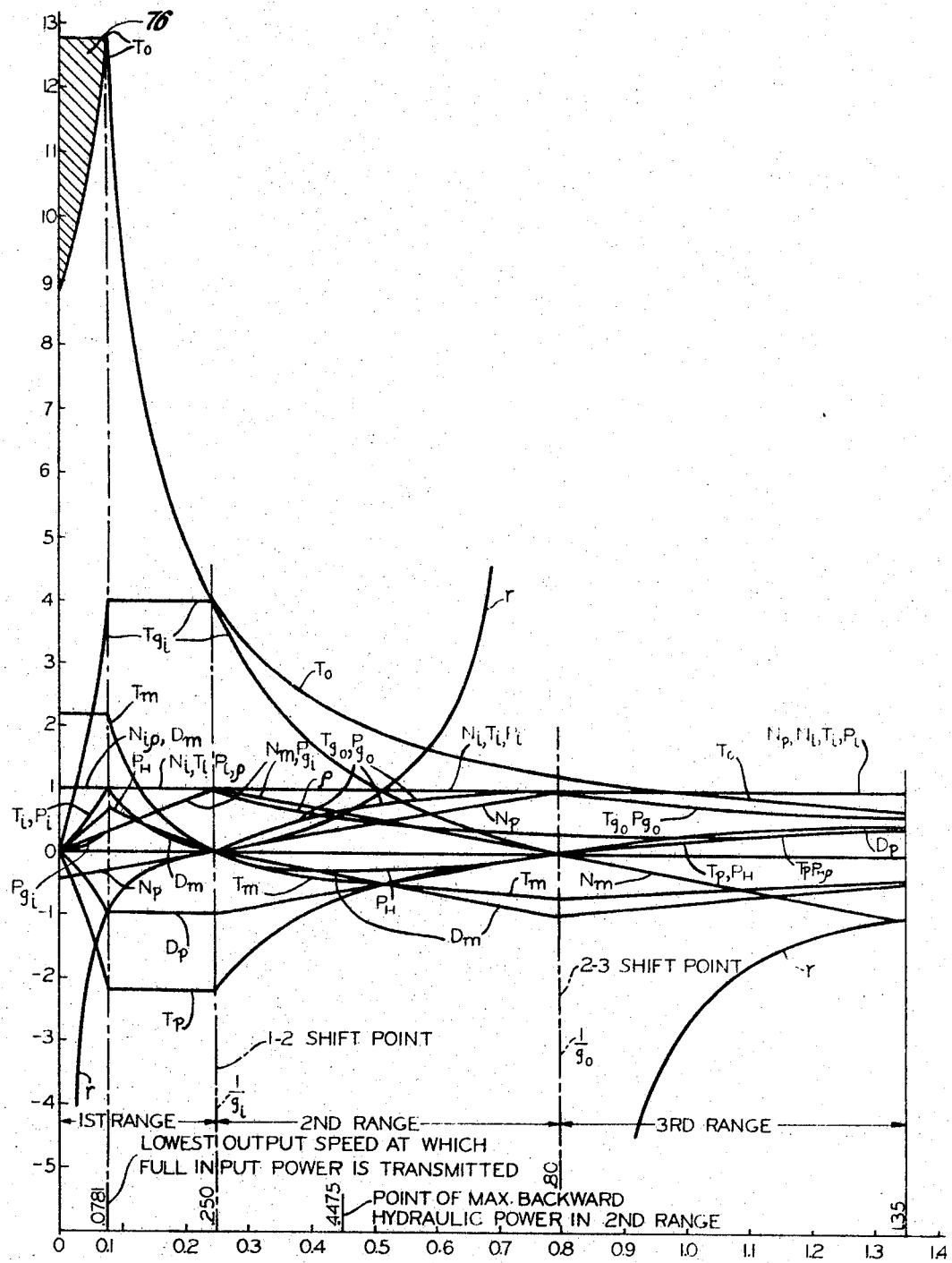

3,470,769
INPUT-SPLIT-POWER, OUTPUT-SPLIT-POWER, COMPOUND-SPLIT-POWER, POWER TRAIN
William G. Livezey, Indianapolis, Ind., assignor to General Motors Corporation, Detroit, Mich., a corporation of Delaware
Filed Oct. 16, 1967, Ser. No. 675,383
Int. Cl. F16h 37/06, 47/04
U.S. Cl. 74—720.5                            13 Claims

ABSTRACT OF THE DISCLOSURE

A vehicle power train having a hydrostatic unit cooperating with a power splitter planetary gear unit and a power combiner planetary gear unit to provide a low speed range input-split-power drive, an intermediate speed range compound-split-power drive, and a high speed range output-split-power drive. Shifts between the drives are provided by speed and torque synchronized friction drive establishing devices in the power train's mechanical power paths.

---

Figure 2:
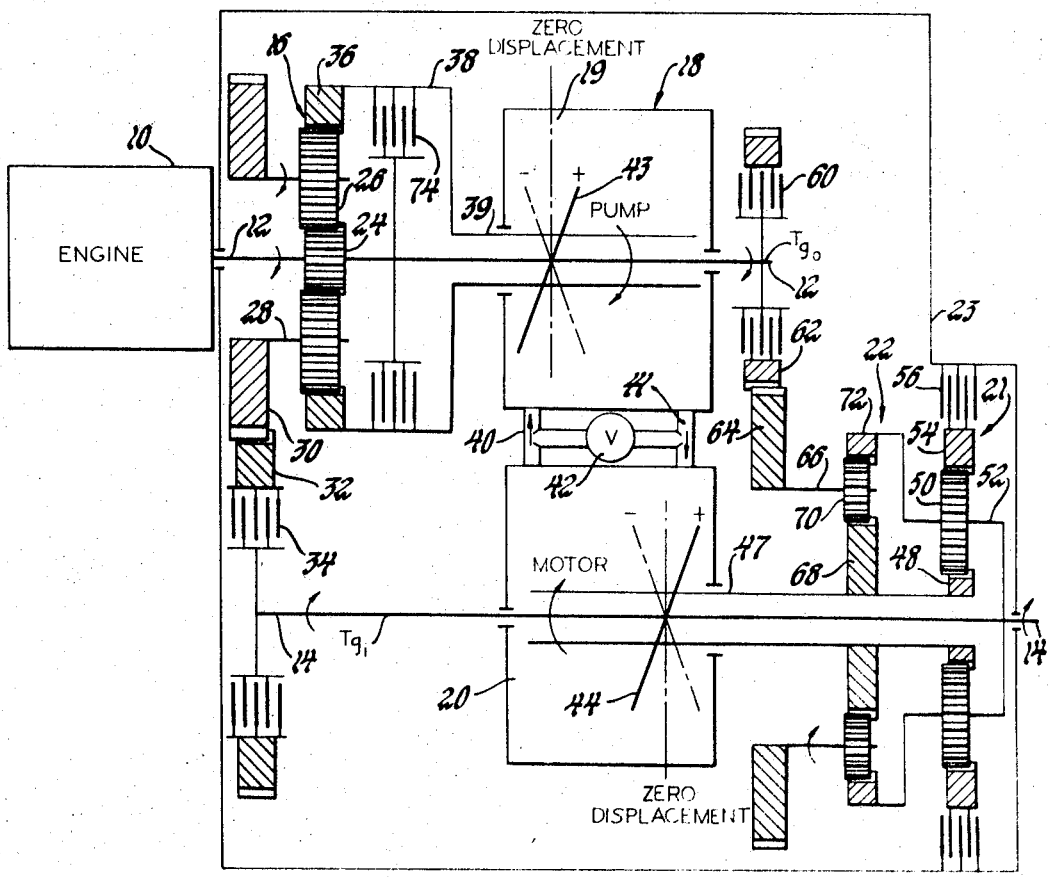

This invention relates to hydromechanical power trains for vehicles and more particularly to a single input, single and dual output hydromechanical power train providing hydromechanical input-split-power drive, output-split-power drive and compound-split-power drive.

It is well known in the vehicle power train art to provide hydrostatic drive cooperating with an all mechanical drive so that the advantages of both drives are available. It is also well known that the speed or drive range coverage, i.e., the speed ratio between input and output, can be extended by providing the mechanical power path with selective, different speed ratios.

It is desirable in split power drives that the hydraulic power path not be subjected to a rapid reversal of speed and torque during range shifting to both simplify hydrostatic unit operation and reduce wear in the range gearing's friction drive establishing devices. It is also desirable to avoid both mechanical regeneration and hydraulic regeneration in all drive phases as much as possible to establish low duty requirements for the mechanical and hydraulic components to promote their durability. In addition, it is desirable that the power train provide 100% or full mechanical drive for maximum power train efficiency at one or more vehicle speeds.

The principle of the present invention lies in the use of simple planetary gearing combined with drive establishing devices and a hydrostatic unit to provide a power train employing the best features of hydromechanical input-split-power drive, output-split-power drive and compound-split-power drive to minimize both mechanical regeneration and hydraulic regeneration and maintain hydraulic power always below input power over a large input-output speed ratio range. The drive establishing devices are connected in the power train to provide synchronized speed and torque shifts in the mechanical power paths while full power transmittal is maintained. The power train drivingly connects an input to a single output to drive a nonsteer-by-driving vehicle in one arrangement and to a pair of outputs to drive a steer-by-driving vehicle with two of the hydromechanical drives in another arrangement. In the case of steer-by-driving vehicles, the hydrostatic units are also operable to provide infinitely variable steer ratios by controlling speed differential between the two outputs.

The power train is illustrated in one embodiment for use in a nonsteer-by-driving vehicle and provides a low, intermediate and high drive range. The power train comprises a power splitter planetary gear set having a driving element continuously driven by the power train input shaft and a pair of driven elements. One driven element is drivingly connected to the power train output shaft by engagement of a dual purpose, low-intermediate clutch and the other driven element is connected to the pump of a hydrostatic unit. The hydrostatic motor is connected to the driving element of a torque multiplier planetary gear set whose driven element drives the power train output shaft and whose recation element provides reaction for the gear set upon engagement of a low brake connected to the reaction element.

The low drive range is established by engaging both the low brake and the low-intermediate clutch. The power splitter gear set apportions the input power between the hydraulic power path provided through the hydrostatic unit and the mechanical power path provided through the low-intermediate clutch to provide input-split power drive in the low drive range with the torque multiplier gear set determining the ratio of hydrostatic motor speed to power train output speed and output torque to motor torque. The hydrostatic pump and motor both have variable displacements and are controlled to infinitely vary the power train speed ratio without the occurrence of either mechanical regeneration of hydraulic regeneration in the low drive range.

The power train input shaft is also drivingly connected by engagement of a second dual purpose, intermediate-high clutch to drive one driving element of a power combiner planetary gear set whose other driving element is driven by the hydrostatic motor and whose driven element is connected by the driven element of the torque multiplier gear set to drive the power train output shaft. The intermediate drive range is established on an upshift by disengaging the low drive brake and engaging the intermediate-high clutch while the low-intermediate clutch remains engaged. The power splitter gear set, the power combiner gear set and the hydrostatic unit cooperate to provide a compound-split-power drive in the intermediate drive range. The power train speed ratio is infinitely varied in this driven range by operation of the hydrostatic unit without the occurrence of mechanical regeneration and with minimum hydraulic regeneration which is a small percentage of input power.

A high clutch, when engaged, locks up the power splitter gear set to drive that pump at input speed and the high drive range is established on an upshift by disengaging the low-intermediate clutch and engaging the high clutch while the intermediate-high clutch remains engaged. The power combiner gear set combines the mechanical power transmitted through the engaged intermediate-high clutch and the hydraulic power from the hydrostatic unit to provide output-split-power drive in the high drive range. The power train speed ratio is infinitely varied in this drive range by operation of the hydrostatic unit without the occurrence of either mechanical regeneration or hydraulic regeneration.

The provision of the compound-split-power drive range intermediate the low input-split power and high output-split power drive provides for 100% mechanical power transmittal at both a low output speed and a medium output speed which are the optimum shift speeds between the low and intermediate drive ranges and the intermediate and high drive ranges, respectively. At the power train's optimum shift speeds, the friction drive establishing device to be engaged on the shift is speed and torque synchronized, i.e. the friction drive establishing device is not subjected to a speed differential and is free of torque. Since all the power continues to be transmitted mechanically during shifting at these optimum speeds, there is no power interruption or power transfer diminution during the shifts.

An object of the present invention is to provide three different split power drives without the occurrence of mechanical regeneration in all drives and without the occurrence of hydraulic regeneration in two of the drives.

Another object is to provide a power train having input-split-power drive, output-split-power and an intermediate compound-split-power drive, and speed and torque synchronized shifts.

Another object is to provide a power train having three different split-power drives and providing solely mechanical drive for power transmittal at a plurality of input-output speed ratios.

Another object is to provide a simple power splitter gear set and a simple power combiner gear set combined with a hydrostatic drive unit to provide a low speed input-split-power drive, an intermediate speed compound-split-power drive and a high speed output-split-power drive.

Another object is to provide a single input, single and dual output power train providing hydromechanical input-split-power drive, compound-split-power drive and output-split-power drive in a low, intermediate and high drive range, respectively, without the occurrence of mechanical regeneration in all drive ranges, without the occurrence of hydraulic regeneration in the low and high drive ranges and hydraulic regeneration amounting to only a small part of input power in the intermediate drive range, and the hydraulic power diminishing to zero at both a low and medium input-output speed ratio, and the shifts between ranges being accomplished with friction drive establishing devices which are speed synchronized and torque free at the low and medium input-output speed ratio.

These and other objects of the present invention will become more apparent from the folowing description and drawing in which:

FIGURE 1 diagrammatically shows a power train constructed according to the present invention.

FIGURE 2 shows typical performance characteristics of the power train.

Figure 3:
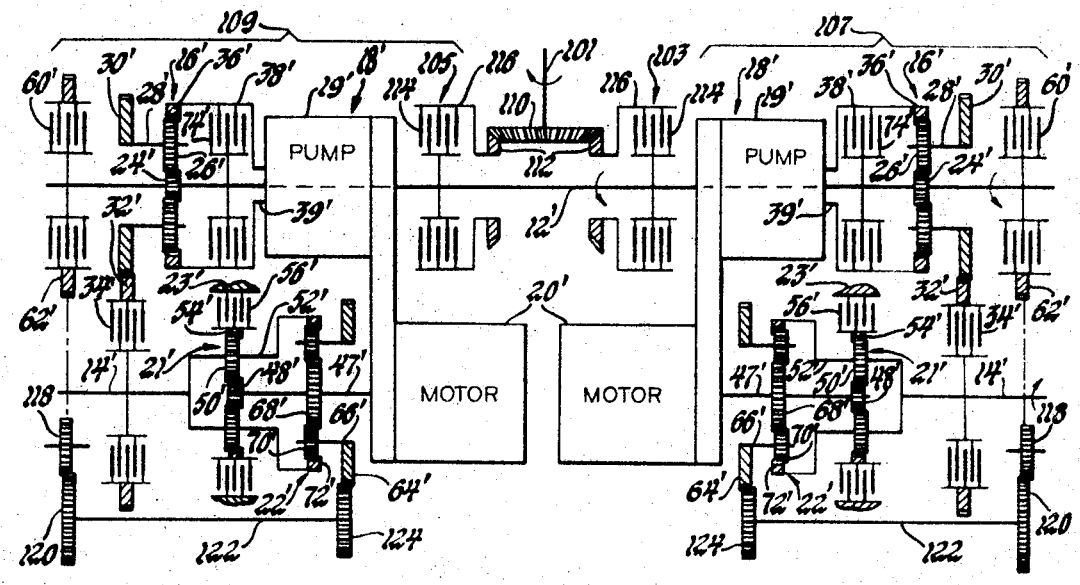

FIGURE 3 diagrammatically shows another embodiment of the power train.

Figure 4:
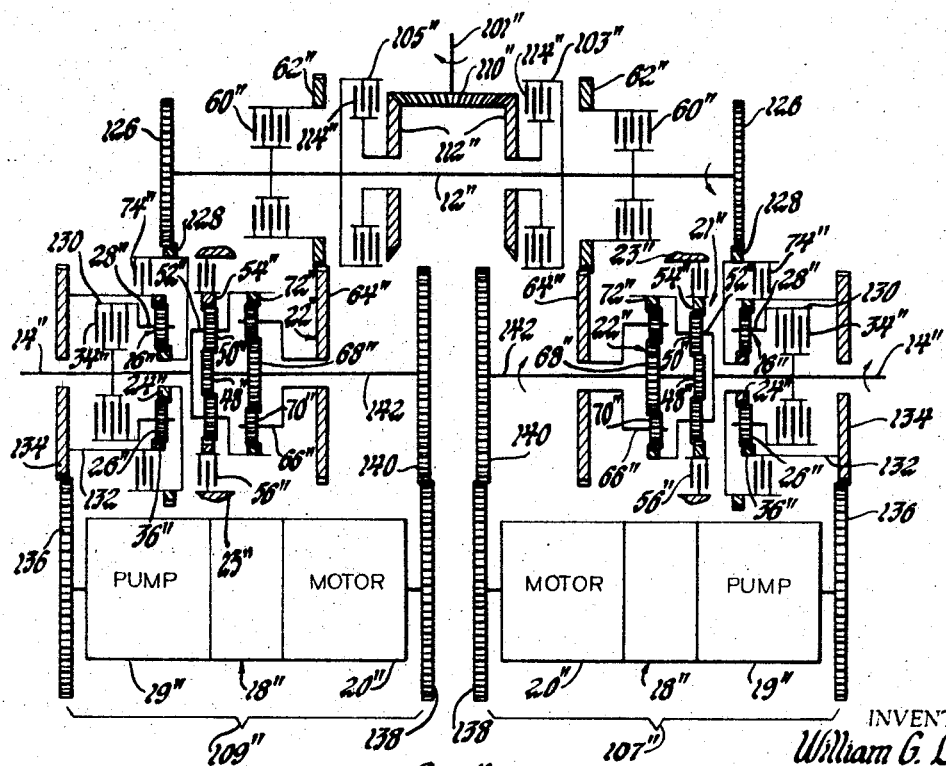

FIGURE 4 diagrammatically shows another embodiment of the power train.

Referring first to FIGURE 1, the invention is illustrated for use in a nonsteer-by-driving vehicle powered by an engine 10. The power train generally comprises an engine driven input shaft 12 operatively drivingly connected to an output shaft 14 by a simple power splitter planetary gear set 16, a hydrostatic unit 18 having a pump 19 and motor 20, a simple torque multiplier planetary gear set 21, and a simple power combiner planetary gear set 22. All of the components are suitablp supported in a power train housing generally designated at 23 and the loaded output shaft 14 is connected by any suitable final drive train, not shown, to drive the vehicle through its driving wheels. The central axes of components 12, 16 and 19 are coincidental and parallel to the coincidental central axes of components 14, 20, 21 and 22 to provide a compact power train structure characterized by the short length.

Input power to the power train is transmitted by the engine driven input shaft 12 which is rigidly connected to the input sun gear 24 of power splitter gear set 16. Sun gear 24 meshes with pinions 26 which are rotatably supported on the output carrier 28. Carrier 28 is rigidly connected to an annular spur gear 30 which is suitably supported for rotation about input shaft 12 intermediate gear set 16 and the engine end of the input shaft. Gear 30 meshes with an annular spur gear 32 which is suitably supported for rotation about the left end of output shaft 14. Gear 32 is connected by engagement of a dual purpose, low-intermediate drive clutch 34 to the output shaft 14, the clutch being concentric with the output shaft. The output ring gear 36 of gear set 16 meshes with pinions 26 and is rigidly conected by drum 38 to sleeve shaft 39 which surrounds input shaft 12 and is connected to drive the hydrostatic pump 19.

The pump 19 and motor 20 both have variable displacements and are hydraulically connected by hydraulic lines 40 and 41 which transmit the hydraulic power between the pump and motor. A two-way relief valve 42 is provided between the lines to protect the hydraulic system against excessive pressure. The pump and motor displacements are controlled by variable angle swash plates 43 and 44, respectively, the principles of operation of the pump and motor being well known in the art.

The motor 20 drives an output sleeve shaft 47 which surrounds output shaft 14 and is rigidly connected to the input sun gear 48 of torque multiplier gear set 21, output shaft 14 extending freely through the motor. Sun gear 48 meshes with pinions 50 rotatably supported on the gear set's output carrier 52 which is rigidly connected to output shaft 14. The reaction ring gear 54 meshes with pinions 50 and is braked by engagement of low drive brake 56 grounded on the power train housing 23.

Input shaft 12 extends freely through pump 19 and is connected at its right end by engagement of a dual purpose, intermediate-high drive clutch 60 to a suitably supported annular spur gear 62, the clutch and gear being concentric with the input shaft. Gear 62 meshes with an annular spur gear 64 which is concentric with the output shaft and rigidly connected to the input carrier 66 of the power combiner gear set 22. Motor output shaft 47 is rigidly connected to the input sun gear 68 of gear set 22 and the sun gear meshes with pinions 70 rotatably supported on the carrier 66. Pinions 70 mesh with the output ring gear 72 which is rigidly connected by the output carrier 52 of gear set 21 to the output shaft 14.

A high drive clutch 74 is mounted concentric with the input shaft and when engaged, clutches the drum 38 and connected ring gear 36 of the power splitter gear set 16 to the input shaft 12 and connected sun gear 24. Thus, the clutch 74 locks up the power splitter gear set to provide a 1:1 speed ratio drive between the power train input shaft 12 and pump input shaft 39.

The brake and clutches or friction drive establishing devices and the hydrostatic unit are conventional and may be operated in any known way, e.g. electrically, hydraulically, pneumatically or by some mechanical provision and according to a certain schedule. A typical operation of the FIGURE 1 power train embodiment is described in the following illustrative summary with the aid of the FIGURE 2 graph and demonstrates the several power train operating features.

FIGURE 1—POWER TRAIN OPERATION

In describing the power train operation, the establishment of the different drives will be discussed before proceeding into a detailed description of the drivers' characteristics and the preferred pump and motor displacement control to accelerate a load using all of the drive ranges.

The low or first drive range is established by engaging only low drive brake 56 and low-intermediate drive clutch 34. The power splitter gear set 16 is conditioned to apportion the input power available at the input shaft 12 between the hydraulic power path through the hydrostatic unit 18 and the mechanical path through the engaged clutch 34. The activated torque multiplier gear set 21 in the hydraulic power path intermediate the hydrostatic unit 18 and output shaft 14 is for providing additional torque multiplication and speed reduction and the two power paths are united at the output shaft to drive the output shaft with the input-split-power drive thus provided.

The intermediate or second drive range is established by engaging only the low-intermediate drive clutch 34 and intermediate-high drive clutch 60. Power splitter gear set 16 is conditioned to apportion the input power between the hydraulic power path through the hydrostatic unit 18 and the mechanical power path through the engaged clutch 34. The power combiner gear set 22 is conditioned to combine the hydraulic power path and the mechanical power path through the engaged clutch 60 which combined power paths provide an output-split-power drive and are united with the mechanical power path through clutch 34 at the output shaft 14 to cooperate with the input-split-power drive. The intermediate drive is thus a combination of input-split-power drive and output-split-power drive and is described as a compound-split-power drive because of the compounded action.

The high or third drive range is established by engaging only intermediate-high drive clutch 60 and high drive clutch 74. Power splitter gear set 16 is locked up and provides a direct drive to the hydrostatic unit 18. The input power follows two paths to the power combiner gear set 22, one path being the hydraulic power path through the hydrostatic unit 18 and the other path being the mechanical power path through the engaged clutch 60. The power combiner gear set 22 is conditioned to combine these two power paths to drive the output shaft 14 with the output-split-power drive thus provided.

To describe and visualize the performance characteristics of my power train I have developed certain nomenclature for a general split power system. This nomenclature embraces the use of directional senses which are referred to as forward or positive (+) and backward or negative (−). These directional senses apply to direction of rotation or speed, torque, power, ratio, pressure, flow and displacement.

The nomenclature is as follows:

$N$ = rotational speed
$T$ = torque
$P$ = power
$R$ = overall power train speed ratio = $N_i/N_o$ Constants $g$ = gear ratio of mechanical path
$g_i = N_i/N_o$ when $N_p = 0$ (input-split-power mechanical path)
$g_o = N_i/N_o$ when $N_m = 0$ (output-split-power mechanical path)
$k$ = gear ratio of input to pump = $N_i/N_p$ when $N_o = 0$
$m$ = gear ratio of motor to output = $N_m/N_o$ when $N_i = 0$
$r$ = hydraulic ratio = $N_p/N_m$
$D_p$ = displacement of pump per revolution
$D_m$ = displacement of motor per revolution
$\rho$ = hydraulic pressure Subscripts $i$ = input
$o$ = output
$g$ = gear path
$p$ = pump 19
$m$ = motor 20
$H$ = hydraulic Direction of rotation of several of the power train elements is indicated in FIGURE 1 by directional arrows. All of the directional arrows show what is considered the forward or positive (+) direction of rotation. Rotation of an element in the opposite direction of an arrow is considered backward or negative (−) rotation.

With regard to torque, sign convention is difficult since a torque tending to turn a member in one direction is resisted by an equal and opposite reaction torque. The following definitions and sign convention are given for the torques in the FIGURE 1 power train.

$T_i$ = input torque, is forward or positive (+) when the engine 10 is driving input shaft 12 in its forward direction of rotation.

$T_o$ = output torque, is forward or positive (+) when output shaft 14 is being rotated in its forward direction and driving a connected load.

$T_p$ = pump 19 torque, is forward or positive (+) when the pump is being driven as a pump in its forward direction of rotation by input pump shaft 39.

$T_m$ = motor 20 torque, is forward or positive (+) when the motor is driving the motor output shaft 47 in its forward direction of rotation.

$T_{g_i}$ = input-split mechanical path torque (considered at point designated $T_{g_i}$ in FIGURE 1), is forward or positive (+) when gear 32 and the low-intermediate clutch 34 are driving output shaft 14 in its forward direction of rotation.

$T_{g_o}$ = output-split mechanical path torque (considered at point designated $T_{g_o}$ in FIGURE 1) is forward or positive (+) when input shaft 12 is driving the intermediate-high clutch 60 and gear 62 in their forward direction of rotation.

With regard to the direction of power, power is considered as flowing in the forward or positive (+) direction when it is flowing from the input toward the output. Since power is the product of torque and speed, power is forward or positive (+) when torque and speed have the same sign. In the power train of the present invention, there are three power paths and the power flows are defiined and have sign convention as follows:

$P_{g_i}$ = input-split mechanical path power, is forward or positive (+) when flowing from carrier 28 to output shaft 14 via meshing gears 30 and 32 and low-intermediate cluth 34.

$P_{g_o}$ = output-split mechanical path power, forward or positive (+) when flowing from input shaft 12 to carrier 66 via intermediate-high clutch 60 and meshing gears 62 and 64.

$P_H$ = hydraulic power, is forward or positive (+) when flowing from pump 19 to motor 20.

Sign convention for the remaining nomenclature is as follows:

$D_p$ = pump 19 displacement, is positive (+) when swash plate 43 is moved from a zero displacement position to a (+) position as shown in FIGURE 1.
$D_m$ = motor 20 displacement, is positive (+) when swash plate 44 is moved from a zero displacement position to a (+) position as shown in FIGURE 1.
$r$ = hydraulic ratio ($r = N_p/N_m = D_m/D_p$) is positive (+) when the direction of the rotation of the pump and motor are of the same sign.
$\rho$ = hydraulic pressure, is positive (+) when the hydraulic passage 41 is the high pressure passage and negative (−) when passage 40 is the high pressure passage. Furthermore, the pressure is positive (+) whenever the direction of torque and displacement in either the pump or the motor are of the same sign. The hydraulic flow is considered positive (+) when it is in the direction of the arrows in passages 40 and 41 and this will occur whenever the direction of rotation and displacement in either the pump or the motor are of the same sign. The direction of hydraulic power is positive (+) when the pressure and flow are of the same sign.

In explaining the performance characteristics of my power train I believe the procedure for setting up an actual construction will be helpful. These performance characteristics are obtained by considering that the power trains' input speed, torque and power are each equal to unity only when the engine is operating at full power and speed and that any lesser values at the input are a fractional part of unity. For simplicity, the mechanical, hydraulic and overall power train efficiencies are considered as 100%.

Initially, some of the power train constants and limiting values are selected according to the intended power train use and from these the remaining power train quantities are determined. For example, my power train may be used in a heavy vehicle to match an engine such as a diesel engine rated at 500 horsepower and 1310 lb. ft. torque at 2000 r.p.m. to the vehicle load over a vehicle speed range of 0–50 m.p.h.

First, the power train output speed at the low to intermediate drive shift point, hereinafter referred to as the 1–2 shift point, and the maximum power train output speed are selected. These speeds may be any reasonable speeds desired for the particular use and for demonstration purposes, the maximum output speed was selected as 1.35 times the input speed at full engine power and the 1–2 shift point output speed as 0.25 times the input speed or $N_o$ (max.)=1.35 and $N_o$ (at the 1–2 shift point)=0.25, considering the input speed of 2000 r.p.m. at full power as unity ($N_i$=1). The speed ratio of the final drive train to the wheels is selected, knowing the wheel radius, so that the vehicle is driven at 50 m.p.h. when the driving power train output shaft is turning at 2700 r.p.m. or 1.35 times the power train input speed of 2000 r.p.m. With this final drive train speed ratio, the 1–2 shift point output speed corresponds to a vehicle speed of 9.26 m.p.h. At the 1–2 shift point the pump speed according to the preferred power train operation is zero ($N_p$=0) and the constant $g_i$ for the low and intermediate drive range is established using the value of $N_o$ at this shift point and found to be equal to 4.0 ($g_i$=4.0).

Next, the maximum motor speed which occurs according to the preferred hydrostatic motor operation at the 1–2 shift point is selected. A suitable maximum motor speed of 2000 r.p.m. which is equal to the power trains' input speed at full power was selected, this speed being well within the optimum speed range of conventional hydrostatic pumps and motors. With the input speed of 2000 r.p.m. at full power considered as unity ($N_i$=1) and therefore $N_m$ (max)=$N_i$=1 and using the output speed $N_o$=0.25 at the 1–2 shift point, the constant $m$ for the low drive range is established and found to be equal to 4.0 ($m$=4.0).

Maximum use of the motor is obtained by setting its maximum speed at maximum power train output speed equal to its maximum speed at the 1–2 shift point but in the opposite rotational directon, motor speed in the intermediate and high drive range being linear function of power train output speed when input speed is constant. The intermediate to high shift point, hereinafter referred to as the 2–3 shift point, according to the preferred power train operation occurs at zero motor speed and with the above described motor conditions, the power train output speed at the 2–3 shift point is established and found to be equal to 0.8 times input speed ($N_o$=0.8 at the 2–3 shift point). With the final drive train ratio discussed previously, the 2–3 shift point output speed corresponds to a vehicle speed of 29.6 m.p.h.

The constant $g_o$ for the intermediate and high drive range is established by using the value of $N_o$ at the 2–3 shift point which thereby synchronizes the intermediate-high clutch for the 1–2 shift and the brake 56 for the 2–1 downshift. The constant $g_o$ was found to be equal to 1.25 ($g_o$=1.25).

The constant $m$ for the intermediate and high drive ranges is determined by the values of $N_o$ and $N_m$ at the 1–2 shift point and $g_o$ and found to be equal to $-1.817$ ($m$=$-1.817$ for the intermediate and high drive ranges).

The low-intermediate clutch 34 and high clutch 74 are synchronized by having pump speed equal to input speed ($N_p$=$N_i$=1) at the 2–3 shift point.

The constant $k$ for the low and intermediate drive range is established by using the values of $N_o$ and $N_p$ at the 2–3 shift point and $g_i$ which thereby synchronizes the low-intermediate clutch 34 and high clutch 74 at the 2–3 shift point. The constant $k$ was found to be equal to $-2.2$ ($k$=$-2.2$). The value of the constant $k$ in the high drive range is $k$=1 since the pump is clutched to the input shaft.

The gear tooth numbers that will give ratios satisfying the established power train constants are next determined and found to be as follows:

| Gear member: | Tooth number |
|---|---|
| Sun gear 24 | 35 |
| Ring gear 36 | 77 |
| Sun gear 48 | 27 |
| Ring gear 54 | 81 |
| Sun gear 68 | 44 |
| Ring gear 72 | 80 |
| Spur gear 30 | 56 |
| Spur gear 32 | 70 |
| Spur gear 62 | 31 |
| Spur gear 64 | 60 |

Describing the general performance characteristics of my power train first before proceeding into a detailed description of the preferred operation, input shaft 12 is always driven by the engine 10 in its forward direction. When the output shaft is driven in its forward direction by the cooperating action of the hydrostatic unit 18 and the input-split mechanical power path drive, the power flows forwardly through the mechanical power path to drive the output shaft forwardly. If the output shaft is driven in its backward direction by the action of the hydrostatic unit and the input-split mechanical power path drive, the power flows backwardly through the mechanical power path and gear or mechanical regeneration occurs, i.e., gear regeneration occurs when the output speed is backward or less than zero ($N_o$<0). When the pump is caused to turn in its backward direction opposite the rotational direction of the input shaft by operation of the hydrostatic unit, its torque is also in the backward direction and the power flows from the pump to the motor forwardly through the hydraulic power path to drive the output shaft. If the operation of the hydrostatic unit causes the pump to turn in its forward direction (same rotational direction as the input shaft), its torque remains in the backward direction and power flows backwardly through the hydraulic power path and hydraulic regeneration occurs. The input-split hydraulic power flow direction is also dependent on the relationship between output shaft speed $N_o$, input shaft speed $N_i$ and the input-split mechanical power path gear ratio $g_i$. When the output shaft speed $N_o$ is less than $N_i/g_i$, forward hydraulic power flow occurs and when $N_o$ is greater than $N_i/g_i$, backward hydraulic power flow occurs, i.e., hydraulic regeneration. Thus, in low drive, power flows forwardly through both the mechanical and hydraulic power paths to provide what is defined as true split power so long as forward output shaft speed $N_o$ is not less than zero and does not exceed $$\frac{N_i}{g_i}\left(0<N_o<\frac{N_i}{g_i}\right)$$

$N_i/g_i$ determining the maximum optimum vehicle speed in the low drive range.

In the high speed, output-split-power drive range, the torque through the output-split mechanical power path is always forward, the constant $g_o$ being positive ($+g_o$). When the output shaft is turned in its forward direction by the cooperating action of the hydrostatic unit 18 and the output-split mechanical power path drive, power flows forwardly through the mechanical power path to drive the output shaft forwardly. If the output shaft is turned backward by the action of the hydrostatic unit and the output-split mechanical power path drive, power flows backwardly through the mechanical power path and gear or mechanical regeneration occurs, i.e., gear regeneration occurs when the output speed is backward or less than zero ($N_o$<0). When the motor is caused to turn in its backward direction by operation of the hydrostatic unit and the motor torque is backward, the hydraulic power flows forwardly from the pump to the motor through the hydraulic power path to drive the output shaft. When the operation of the hydrostatic unit causes the motor to turn in its forward direction and the output torque is also forward, power flows backwardly through the hydraulic power path. If the motor is turning backwardly and the output torque is forward, the power flows forward through the hydraulic path and split power occurs. The output-split hydraulic power flow direction is also dependent on the relationship between output shaft speed $N_o$, input shaft speed $N_i$ and the output-split mechanical power path gear ratio $g_o$. When the output shaft speed $N_o$ is greater than $$\frac{N_i}{g_o} (N_o > 0)$$

forward hydraulic power flow occurs and when $N_o$ is between zero and $$\frac{N_i}{g_o} \left( 0 < N_o < \frac{N_i}{g_o} \right)$$

hydraulic regeneration occurs. Thus, in high drive, power flows forwardly through both the mechanical and hydraulic power paths to provide true split power so long as output shaft speed $N_o$ is maintained greater than $$\frac{N_i}{g_o} \left( N_o > \frac{N_i}{g_o} \right)$$

$N_i/g_o$ determining the minimum optimum vehicle speed in the high drive range.

In the intermediate drive range which combines the input-split and output-split power drives, the conditions for avoiding mechanical or gear regeneration in the input-split and output-split mechanical power path drives are the same as discussed above. The hydraulic power flow direction in the intermediate drive is dependent on the relationship between output shaft speed $N_o$, input shaft speed $N_i$ and both the input-split and output-split mechanical power path gear ratios $g_i$ and $g_o$. When output shaft speed $N_o$ is greater than $N_i/g_o$ and less than $N_i/g_i$ forward hydraulic power flow occurs, and when $N_o$ is less than $N_i/g_o$ and greater than $N_i/g_i$, backward hydraulic power flow occurs. Thus, with the hydrostatic unit 18 operated to cause the output shaft to turn in its forward direction, power flows forwardly through the hydraulic power path so long as output shaft speed $N_o$ is greater than $N_i/g_o$ and less than $N_i/g_i$ which thus determine the minimum and maximum optimum vehicle speeds for this type of drive.

In order to set up the proper conditions of operation for the hydrostatic unit 18 which provide for synchronous speed and torque shifting between the intermediate drive range and the low and high drive ranges, $N_i g_i$ is less than $N_i/g_o$. Even though this reversal of the optimum relationship between these parameters to provide for synchronous speed and torque shifting results in hydraulic regeneration in the intermediate drive range, the hydraulic regeneration amounts to only a small percentage of the power train input power as will be discussed in greater detail later.

The performance characteristics of the power train with the preferred set up and operation of the hydrostatic unit will now be described with the aid of FIGURE 2 which shows power train performance measured along the ordinate plotted against output speed measured along the abscissa using the nomenclature defined previously with input speed considered as being constant throughout the entire output speed range. With the values of $g_o$, $g_i$, $k$ and $m$ already established, the values of $T_m$ and $T_p$ for the pump and motor are established for any output speed $N_o$ throughout the full operating range of the power train and since hydrostatic system pressure equals $$\frac{T_m \times 2\pi}{D_m} = \frac{T_p \times 2\pi}{D_p}$$

for all of the drive ranges, the establishment of a desired value of either $p$, $D_m$ or $D_p$ determines the values of the others. In the preferred hydrostatic unit construction the maximum pump and motor displacements $D_p$ and $D_m$ are equal $(D_p = D_m)$ and maximum hydrostatic system pressure which is set by the two-way relief valve 42 may be any reasonable value desired such as 5000 p.s.i., i.e. $p(\text{max}) = 5000$ p.s.i. Maximum system pressure is also assigned a value of unity, i.e. $p(\text{max}) = 1$, in keeping with the other dimensionless nomenclature and any lesser pressure is considered as a fractional part of unity. In the low drive range the values of $D_p$ and $D_m$ are fixed by the selected power train parameters and the use of maximum system pressure throughout this range. From these values, the value of maximum or full pump and motor displacement is also established and found to be equal to 43.5 cubic inches per revolution, i.e., $D_p(\text{max}) = D_m(\text{max}) = 43.5$ cubic inches per revolution. Maximum displacement is also assigned a value of unity, i.e., $D_p(\text{max}) = D_m(\text{max}) = 1$, in keeping with the other dimensionless nomenclature and any lesser displacement is considered as a fractional part of unity.

In the low drive range, the pump must have a torque capacity at full displacement and maximum system pressure of at least 2.2 times the maximum input torque to provide the full input-split reaction torque since the gear ratio between the input and the pump is $-2.2$ ($k = -2.2$). At zero output speed ($N_o = 0$) the hydrostatic unit is conditioned so that the motor is at full positive displacement ($D_m = 1$) and the pump is at zero displacement ($D_p = 0$). With $D_p = 0$, the pump can produce no reaction torque against the input and therefore there is no input torque or power at zero output speed. Since the carrier 28 of splitter gear set 16 is stationary because of reaction from the load, the pump input shaft 39 rotates backwardly at the pump idle speed indicated by the $N_p$ curve's intersection with the ordinate which speed is determined by the gear ratio $k$.

With the hydrostatic system operating at maximum pressure ($p = 1$) throughout the low drive range and with reference to the FIGURE 2 graph, as the pump displacement $D_p$ is increased from zero, the pump torque $T_p$, the input torque $T_i$ and the input-split mechanical power path torque $T_{gi}$ are all increased proportionately. At full pump displacement, the maximum input torque ($T_i = 1$) is absorbed and the maximum value of $T_{gi}$ is reached which is $T_{gi}(\text{max.}) = g_i T_i = 4 T_i$.

Since the motor is the same size as the pump, the maximum motor torque at maximum pressure is also 2.2 times maximum input torque. This motor torque times the gear ratio $m = 4$ for the low drive range results in an output torque produced by the motor $T_o = m T_m(\text{max}) = 4 \times 2.2 = 8.8$ times maximum input torque.

The total output torque $T_o$ in the low drive range is the sum of the torque produced by the motor and the mechanical power path torque $T_{gi}$. Thus, when the pump and motor are both at full displacement, output torque $T_o = 12.8$ times maximum input torque.

In the low drive range the pump rotation is backward ($-$) while motor rotation is forward ($+$) and therefore the hydraulic ratio $r = N_p/N_m$ is negative ($-$). Since the hydraulic ratio is also equal to $D_m/D_p$, $D_m$ is positive ($+$) and $D_p$ is negative ($-$). At maximum pump and motor displacement, $D_p = -1$ and $D_m = 1$ and therefore $r = -1$ at this condition. Using this value of $r$, it is found that $N_o = 0.0781$ is the lowest output speed at which the power train will absorb full input torque and power and is also the speed at which it produces the highest output torque ($T_o = 12.8$).

At output speeds below 0.0781 and with the motor at full displacement and continuing to produce an output torque of 8.8 times maximum input torque, $T_{gi}$ decreases with decreasing output speed due to the decrease in pump displacement. Thus, the power train produces an output torque of 8.8 at $N_o=0$ which rises to 12.8 at $N_o=0.0781$. At output speeds of 0.0781 and higher the power train operation is at full input torque and power and the output torque $T_o$ is equal to $1/N_o$ ($T_o=1/N_o$) in all of the drive ranges.

Thus far in the description of low drive performance, it has been considered that relief valve 42 has not blown. In starting the vehicle from rest, when the output torque $T_o$ requirements are below 8.8 the vehicle will start immediately when the pump starts displacing oil but when the output torque requirements are above 12.8 the vehicle will not move. When the output torque requirements are between 8.8 and 12.8 in starting heavy loads the pump displacement is increased until the input-split mechanical torque $T_{gi}$ builds up sufficiently to supplement the motor torque to start or accelerate the vehicle from rest. During this buildup, the vehicle and motor output do not more, and the oil displaced by the pump is blown through relief valve 42 from line 41 to 40. During the blow-by period the oil absorbs the input power in the form of heat resulting in the oil temperature rising rapidly, however, this is an adverse starting condition for heavy loads which exist for only a short period of time, e.g. one second or so. The shaded area 76 in FIGURE 2 is the zone in which the blow-by occurs.

During the pump displacement increase from zero in the low drive range while motor displacement remains constant, the pump speed $N_p$ in the backward direction decreases linearly and the motor speed $N_m$ in the forward direction increases linearly. The speed of the multiplier sun gear 48 is thus increased in the forward direction and has an increasing forward drive speed component to increase output speed $N_o$ in the forward direction. At the lowest full power absorption output speed of $N_o=0.0781$ which occurs at maximum pump displacement, the hydraulic power $P_H$ transmitted is approximately 70% of full input power and the mechanical power $P_{gi}$ transmitted is the remaining 30% of full input power.

Increased output speed in the low drive range above $N_o=0.0781$ is obtained by holding the pump displacement at its maximum ($D_p=-1$) and decreasing motor displacement as shown in FIGURE 2. Pump torque $T_p$ is then constant and motor torque $T_m$ decreases. Pump speed $N_p$ in the backward direction thereby continues to decrease linearly and motor speed $N_m$ thereby continues to increase linearly in its forward direction. The hydraulic power $P_H$ now decreases linearly and the mechanical power $P_{gi}$ continues to increase, the mechanical power now increasing linearly.

At the output speed of $1/g_1$ ($N_1=1$) the motor is at zero displacement and is rotated at input speed in its forward direction by gear set 21 while the pump is maintained at maximum displacement and thus maximum pump torque $T_p$ and minimum or zero motor torque $T_m$ occur at this low vehicle speed or input shaft-output shaft speed ratio. Hydraulic power $P_H$ is zero and the mechanical power path carries all the power transmitted to drive the output shaft, i.e. $P_{gi}$ is 100% of input power. This low vehicle speed is the optimum shift speed for shifting between the low and intermediate drive ranges since up to this 1–2 shift point neither gear nor hydraulic regeneration has occurred between the low drive speed limits thus determined. The speed ratio between the driven clutch member of the intermediate-high clutch 60 and the power train output shaft 14 has been determined so that at the output shaft speed of $1/g_1$ (the 1–2 shift point) the driven clutch member is rotating in the same direction and at the same speed as the driving clutch member. Since the motor torque $T_m$ is zero at the output speed of $1/g_1$, the intermediate-high clutch 60 is torque unloaded in addition to being speed synchronized at the 1–2 shift point. Accordingly, for an optimum shift from low drive range to the intermediate drive range the low brake 56 is disengaged and the speed and torque synchronized intermediate high clutch 60 is engaged while the low-intermediate clutch 34 remains engaged. The motor and connected multiplier sun gear 48 and the output shaft and connected multiplier carrier 52 rotate in the same direction and at a speed ratio such that when output shaft speed is $1/g_1$ the multiplier ring gear 54 is then at zero speed and provides no torque reaction, i.e. is torque unloaded in this condition. Thus, the low brake 56 is both speed and torque synchronized for a downshift from the intermediate drive range to the low drive range at the optimum low-intermediate shift condition.

The values of $N_p$, $T_p$, $N_m$, and $T_m$ at the start of the intermedaite drive range are equivalent to their values at the end of the low drive range as shown in FIGURE 2. In the intermediate drive range, motor displacement is changed linearly from zero at the 1–2 shift point to maximum displacement ($D_m=-1$) at the 2–3 shift point while pump displacement is changed linearly from $D_p=-1$ at the 1–2 shift point to zero at the 2–3 shift point. The pump now reverses its rotational direction and has a forward speed increasing linearly while motor speed in the forward direction now decreases linearly. The speed of the forwardly rotating combiner sun gear 68 is thus decreased and since its speed component subtracts from the forward speed component of the combiners carrier 66, the output shaft speed $N_o$ increases with decreasing motor speed in the forward direction throughout the intermediate drive range. Motor torque $T_m$ reverses and increases throughout the intermediate drive range finally reaching $-0.6875$ at the 2–3 shift point, while pump torque $T_p$ remains backward and decreases finally reaching zero at the 2–3 shift point.

The mechanical power $P_{gi}$ transmitted by the input-split mechanical power path in the intermediate drive range decreases linearly with increasing output speed until no mechanical power is transmitted by this power path at the output shaft speed of $1/g_o$ (2–3 shift point). The mechanical power $P_{go}$ transmitted by the output-split mechanical power path increases from zero at the output speed of $1/g_1$ at a relatively rapid rate in the low speed end of the intermediate drive range with the rate gradually decreasing with increasing output speed until the output-split mechanical power path carries 100% of the input power ($P_{go}=1$) at the output shaft speed of $1/g_o$. Since $1/g_1$ is less than $1/g_o$ in order to establish the torque free condition of clutch 60 for shifting, there is slight hydraulic regeneration in the intermediate drive range as shown by the backward or negative (—) values of the hydraulic power $P_H$ curve in FIGURE 2, the hydraulic regeneration being carried back forwardly only by the $P_{go}$ path. The hydraulic power $P_H$ being initially zero at the beginning of the intermediate drive range increases in the backward power flow direction until it reaches a maximum negative value of approximately $-0.3$ ($P_H=-0.3$ times full input power) at about one-third of the way through the intermediate speed range. This point of maximum backward hydraulic power occurs at the intersection of the $P_{gi}$ and $P_{go}$ curves and was found to correspond to an output speed $N_o=0.4475$. Thereafter, the backward flowing hydraulic power gradually decreases with increasing output speed until the hydraulic power path transmits no power which occurs at the output speed of $1/g_o$ (2–3 shift point).

The gear ratio between the driven clutch member of the high clutch 74 and the output shaft 14 has been determined so that at the output shaft speed of $1/g_o$, the driven clutch member and connected pump input shaft 39 are rotating in the same direction and at the same speed as the driving clutch member which is directly driven by the input shaft. Since the pump torque $T_p$ is zero at the output of $1 g_p$ the high clutch 74 is torque unloaded in addition to being speed synchronized at the 2–3 shift point. Accordingly, for an optimum shift between the intermediate and high drive ranges, the low-intermediate clutch 34 is disengaged and the speed and torque synchronized high clutch 74 is engaged while the low brake 56 remains disengaged and the intermediate-high clutch 60 remains engaged. The driving and driven clutch members of the low-intermediate drive clutch 34 rotate in the same direction and at the same speed which is output shaft speed and equal to $1/g_o$ and since the pump torque $T_p$ is zero at this output speed the low-intermediate drive clutch 34 is speed and torque synchronized for a downshift from the high drive range to the intermediate drive range at the optimum intermediate-high shift condition.

The values of $N_p$, $T_p$, $N_m$ and $T_m$ immediately before and after the intermediate-high shift are the same as shown in FIGURE 2 like at the optimum low-intermediate shift condition. In the high drive range, the motor displacement is changed linearly from its maximum negative displacement ($D_m = -1$) at the 2–3 shift point to a displacement value which will produce a maximum system pressure of 2,000 p.s.i. ($\rho = 0.4$) at maximum output speed. Pump displacement is increased from zero at 2–3 shift point to positive values according to the previously mentioned relationship $$\rho = \frac{T_m \times 2\pi}{D_m} = \frac{T_p \times 2\pi}{D_p}$$

With the pump driven directly by the input shaft, the motor direction reverses to its backward rotational direction and increases linearly with increasing pump displacement and decreasing motor displacement. The direction of rotation of combiner sun gear 68 is thus changed to its backward direction and therefore has an increasing forward drive speed component to increase output shaft speed in the forward direction in cooperation with the forward drive speed component of the combiner's carrier 66. As the hydrostatic unit's displacements are changed both the forward pump $T_p$ and the forward hydraulic power $P_H$ increases almost linearly, both the output-split mechanical torque $T_{go}$ and power $P_{go}$ which are forwardly acting decrease almost linearly, and the backward motor torque $T_m$ decreases almost linearly. At maximum output speed which occurs at maximum motor speed, the hydraulic and mechanical paths share the total power transmitted. Thus, neither gear nor hydraulic regeneration has occurred throughout the high drive range.

Thus, the power train is operable to provide input-split-power drive without either gear or hydraulic gear regeneration for low vehicle speed operation, compound-split-power drive with no gear regeneration and relatively small hydraulic regeneration which never exceeds input power for intermediate vehicle speed operation and output-split-power drive without either gear regeneration or hydraulic regeneration for high vehicle speed operation. Since hydraulic regeneration only occurs during the intermediate drive range and then never exceeds input power the duty requirements for the hydrostatic unit are low resulting in prolonged hydrostatic unit life. In addition, the power train provides for synchronized speed and torque shifting between all drive ranges, and also provides an all mechanical drive at both low and medium vehicle speeds. Since there is neither speed nor torque loading in the drive establishing device that is engaged for either an upshift or downshift between the intermediate drive range and the low and high drive range the shifts occur without friction plate slippage and shift shock and there is no interruption or diminution of the power being transmitted. The power train can also be shifted at an output speed considerably less or greater than the optimum shift points without experiencing considerable friction plate slippage and shift shock since the relative speed in the friction engaging device or devices to be engaged gradually increases from zero below and above the optimum shift points. Furthermore, the hydrostatic pump and motor are not subjected to instantaneous changes in speed and direction during the transitions between the drive ranges. Since there are two vehicle speeds at which the mechanical drive transmits 100% of the input power, the operator has a selection of vehicle speeds at which optimum power train efficiency occurs.

FIGURE 3 EMBODIMENT

The power train embodiment shown in FIGURE 3 combines similar split-power drive train arrangements according to the FIGURE 1 embodiment to provide a dual output power train providing hydromechanical input-split-power drive, compound-split-power drive and output-split-power train drive according to the present invention for use in a steer-by-driving vehicle. The power train input shaft 101 is operatively connected to right and left vehicle tracks, not shown, by a forward drive clutch unit 103, a reverse drive clutch unit 105 and a right and a left, single input, single output power train assembly 107, 109, the assemblies 107 and 109 being similar to each other and to the FIGURE 1 embodiment. The axis of input shaft 101 is arranged longitudinal of the vehicle to provide what is referred to as a "T" input drive for the power train whose two output shafts as described in detail later are arranged to be transverse of the vehicle and axially aligned.

Since the drive clutch units 103 and 105 are similar the following description of one unit applies to the other similar and axially aligned unit. Furthermore, since the single input, single output power train assemblies 107 and 109 are each similar to the FIGURE 1 power train, the FIGURE 3 split-power drive train assemblies 107 and 109 have like numerals but primed for identifying the corresponding parts shown in FIGURE 1 and new numerals for added parts.

Input to both power train assemblies 107 and 109 is provided by the input shaft 101 being connected to drive a bevel gear 110 which meshes with a pair of opposed bevel gears 112, the axes of gears 110 and 112 being at right angles. Each of the clutch units 103 and 105 has a friction clutch plate assembly 114 for connecting a clutch drum 116 connected to one of the bevel gears 112 to shaft 12' which is in the form of a cross shaft and serves as an input to both split-power drive train assemblies 107 and 109.

In each split-power drive train assembly the input shaft 12' extends freely through the pump 19' of the hydrostatic unit 18' and is connected at the outboard side of the pump to the input sun gear 24' of the outboard located power splitter gear set 16'. Sun gear 24' meshes with pinions 26' supported on output carrier 28', carrier 28' being rigidly connected to annular spur gear 30' which is supported for rotation about shaft 12' outboard of gear set 16'. Gear 30' meshes with annular spur gear 32' which is supported for rotation about the output shaft 14'. Gear 32' is connected by engagement of low-intermediate drive clutch 34' to the output shaft 14', the clutch being concentric with the output shaft. The output ring gear 36' of gear set 16' meshes with pinions 26' and is rigidly connected by drum 38' to sleeve shaft 39' which surrounds input shaft 12' and is connected to drive the hydrostatic pump 19'.

The output shaft 47' of each motor 20' is rigidly connected to the input sun gear 48' of the torque multiplier gear set 21'. Motor 20', shaft 47' and gear set 21' are all axially aligned with the power train output shaft 14'. Sun gear 48' meshes with pinions 50' rotatably supported on the gear set's output carrier 52' which is rigidly connected to the power train output shaft 14'. The reaction ring gear 54' meshes with pinions 50' and is braked by engagement of the low drive brake 56' grounded on the power train housing 23'.

Each outboard end of shaft 12' is connected by engagement of the outboard located intermediate-high drive clutch 60' to the annular spur gear 62', the clutch and gear being concentric with shaft 12'. Gear 62' is geared to the annular spur gear 64' rigidly connected to the input carrier 66' of the power combiner gear set 22' by means of an idler gear 118 meshing with gear 62' and a spur gear 120. Gear 120 is rigidly connected to the outboard end of a shaft 122 which is suitably journaled in the transmission housing. A spur gear 124 rigidly connected to the inboard end of shaft 122 meshes with gear 64' to complete the geared drive between gears 62' and 64'.

Motor output shaft 47' is rigidly connected to the input sun gear 68' of gear set 22' and the sun gear meshes with pinions 70' rotatably supported on the carrier 66'. Pinions 70' mesh with the output ring gear 72' which is rigidly connected by the output carrier 52' of gear set 21' to the output shaft 14'. The high drive clutch 74' is mounted concentric with shaft 12' and is for clutching the drum 38' and connected ring gear 36' of the power splitter gear set 16' to the input shaft 12' and connected sun gear 24.'

The principles of operation of the power train assemblies 107 and 109 are like the FIGURE 1 embodiment previously described and are operable in combination with the forward drive clutch unit 103 engaged to drive output shafts 14' at the same speed and in the same forward direction by simultaneous and similar control of the hydrostatic units' displacements in the low, intermediate and high drive range, such operation propelling the vehicle forwardly in a straight line. The provision of the reverse drive clutch unit 105 is for reversing the input to both the power train drive assemblies 107 and 109 so that the power train is operable to provide the same drive ranges in reverse for straight line vehicle drive.

Steering in the low, intermediate and high drive range both in forward and reverse is accomplished by independent control of one of the hydrostatic units to increase or decrease output shaft speed on one track side and also by simultaneous control of both hydrostatic units to increase output shaft speed on one track side while decreasing output shaft speed on the other track side.

FIGURE 4 EMBODIMENT

The dual output, power train embodiment shown in FIGURE 4 is similar to the FIGURE 3 arrangement but has the splitter gear set and the hydrostatic units arranged to provide a three barrel configuration, i.e., three main axes of rotation as compared with the two barrel, two main axes arrangement in FIGURE 3, the FIGURE 4 arrangement being characterized by its short width running transverse of the vehicle. The FIGURE 4 power train embodiment has like numerals but double primed for identifying the corresponding parts shown in FIGURE 3 and new numerals for added parts. The input shaft 101" is drivingly connected via bevel gears 110" and 112" and either forward clutch unit 103" or reverse clutch unit 105" to shaft 12". In the FIGURE 4 embodiment each of the splitter gear sets 16" is located outboard of the multiplier gear set 21" and concentric with the output shaft 14". The cross shaft 12" which transmits input power to both the split power drive train assemblies 107" and 109" is connected at each outboard end to a spur gear 126 which is in mesh with a spur gear 128 rigidly connected to the sun gear 24" of gear set 16", sun gear 24" being annular and concentric with the output shaft 14" and gears 126 and 128 providing a continuous drive connection between shaft 12" and splitter sun gear 24". Sun gear 24" meshes with pinions 26" which are rotatably supported on the output carrier 28". Carrier 28" is rigidly connected to a drum 130 which is clutched by engagement of the low-intermediate drive clutch 34" to the output shaft 14", the clutch being concentric with the output shaft and outboard of the splitter gear set. The output ring gear 36" of gear set 16" meshes with pinions 26" and is rigidly connected by a drum 132 to an annular spur gear 134 located outboard of the low-intermediate drive clutch 34" and concentric with the output shaft 14".

Gear 134 meshes with a spur gear 136 which is connected to drive the hydrostatic pump 19", the pump 19" and motor 20" of the hydrostatic units being arranged back to back and having a common axis offset from the output shaft axis. The hydrostatic units are also axially aligned relative to each other.

Each motor 20" is rigidly connected to drive a spur gear 138 which meshes with a spur gear 140 rigidly connected to the inboard end of a shaft 142 axially aligned with the output shaft 14". Shaft 142 is rigidly connected to the input sun gear 48" of the torque multiplier gear set 21". Sun gear 48" meshes with pinions 50" on the gear set's output carrier 52" which is rigidly connected to output shaft 14". The reaction ring gear 54" meshes with pinions 50" and is braked by engagement of the low drive brake 56" grounded on the power train housing 23".

Cross shaft 12" is connected at a point intermediate the disc clutch assembly 114" and gear 126 by engagement of the intermediate-high drive clutch 60" to the spur gear 62", the clutch and gear 62" being concentric with the shaft 12". Gear 62" meshes with the annular spur gear 64" which is concentric with shaft 142 and is rigidly connected to the input carrier 66" of the power combiner gear set 22". The shaft 142 is rigidly connected to the input sun gear 68" of gear set 22", the sun gear meshing with pinions 70" on carrier 66". Pinions 70" mesh with the output ring gear 72" which is rigidly connected by the output carrier 52" of gear set 21" to the output shaft 14".

Each high drive clutch 74" is mounted concentric with the output shaft 14" and upon engagement clutches the drum 132 and connected ring gear 36" of the power splitter gear set 16" to the gear 128 continuously driven by the shaft 12". Thus, the clutch 74" locks up the power splitter gear set to provide a 1:1 speed ratio drive therethrough.

The operation of the FIGURE 4 embodiment is like that of the FIGURE 3 embodiment. Thus, both the FIGURE 3 and FIGURE 4 embodiments employ the basic principles of operation of the FIGURE 1 embodiment to provide a full reversing, dual output power train providing the same input-split-power drive, compound-split-power drive, and output-split-power drive range in forward and reverse and steering in all drive ranges.

The above described preferred embodiments are illustrative of the invention which may be modified within the scope of the appended claims.

I claim:

1. In a power train the combination of an input member; an output member; means for providing a pair of input-split power paths and a pair of output-split power paths between said input member and said output member; hydraulic power transmitting means in one power path of each pair of power paths for providing an infinitely variable speed ratio drive; power divider means for apportioning input power betweeen said input-split power paths to provide an input-split-power drive; and power combiner means for combining the power in said output-split power paths to provide out-split-power drive and also for cooperating with said power divider means to provide a compound-split-power drive.

2. In a power train the combination of an input member; an output member; means for providing a pair of input-split power paths and a pair of output-split power paths between said input member and said output member with one power path common to both pairs; hydrostatic drive means having a hydraulicaly coupled infinitely variable displacement pump and an infinitely variable displacement motor in said common power path for providing an infinitely variable hydrostatic drive; a power divider planetary gear set for apportioning input power between said input-split power paths to provide a low speed range, input-split-power drive; and a power combiner planetary gear set for combining the power in said output-split power paths to provide a high speed range, output-split-power drive and also for cooperating with said power divider planetary gear set to provide an intermediate speed range, compound-split-power drive.

3. In a power train the combination of an input member; an output member; power path means for providing a pair of input-split power paths and a pair of output-split power paths between said input member and said output member with one power path common to both pairs; hydrostatic drive means having a hydraulically coupled infinitely variable displacement pump and an infinitely variable displacement motor in said common power path for providing an infinitely variable hydrostatic drive; power divider means for apportioning input power between said input-split power paths to provide an input-split-power drive; power divider means for combining the power in said output-split power paths to provide an output-split power drive and also for cooperating with said power divider means to provide a compound-split-power drive; and said power splitter means, said power combiner means and said power path means cooperating to provide an all mechanical input-split drive using the other input-split power path and an all mechanical output-split drive using the other output-split power path having an input speed/output speed ratio less than that of said input-split drive.

4. In a power train the combination of an input member; an output member; a hydrostatic unit having an infinitely variable displacement pump and an infinitely variable displacement motor; a power splitter planetary gear set having a splitter input element and a pair of splitter output elements; said splitter input element drivingly connected to said input member; drive means for drivingly connecting one of said splitter output elements and said pump; a clutch for locking up said splitter planetary gear set; drive means including a selectively operable clutch for selectively drivingly connecting the other splitter output element and said output member; drive means for selectively drivingly connecting said motor and said output member; a power combiner planetary gear set having a pair of combiner input elements and a combiner output element; drive means for drivingly connecting said motor and one of said combiner input elements; drive means including a selectively operable clutch for selectively drivingly connecting said input member and the other combiner input element; and drive means for drivingly connecting said combiner output element and said output member.

5. In a power train the combination of an input shaft; an output shaft; a hydrostatic unit having an infinitely variable displacement pump and an infinitely variable displacement motor; a power splitter planetary gear set having a sun gear, a ring gear and a carrier with a pinion meshing with said sun gear and said ring gear; said input shaft drivingly connected to said splitter sun gear; drive means for continuously drivingly connecting said splitter ring gear and said pump; a high drive clutch for locking up said power splitter planetary gear set; drive means including a low-intermediate drive clutch for drivingly connecting said splitter carrier and said output shaft; a power combiner planetary gear set having a sun gear, a ring gear and a carrier with a pinion meshing with said sun gear and said ring gear; drive means for continuously drivingly connecting said motor and said combiner sun gear; drive means including an intermediate-high drive clutch for drivingly connecting said input shaft and said combiner carrier; a torque multiplier-speed reducer planetary gear set having a sun gear, a ring gear and a carrier with a pinion meshing with said sun gear and said ring gear; drive means for continuously drivingly connecting said motor and the sun gear of said torque multiplier-speed reducer gear set; the carrier of said torque multiplier-speed reducer gear set, said output shaft and said combiner ring gear all being drivingly connected; and a low drive brake for braking the ring gear of said torque multiplier-speed reducer gear set whereby engagement of said low drive brake and said low-intermediate drive clutch establishes a low speed range, input-split-power drive between said shafts, engagement of said low-intermediate drive clutch and said intermediate-high drive clutch establishes an intermediate speed range, compound-split-power drive between said shafts, and engagement of said intermediate-high drive clutch and said high drive clutch establishes a high speed range, output-split-power drive between said shafts.

6. The power train set forth in claim 5 and said input shaft, said power splitter gear set, said high drive clutch, said pump and said intermediate-high drive clutch all having aligned central axes; said low-intermediate drive clutch, said motor, said power combiner gear set, said torque multiplier-speed reducer gear set and said output shaft all having aligned central axes offset from and parallel to said first mentioned axes.

7. The power train set forth in claim 5 and said input shaft and said intermediate-high drive clutch having aligned central axes; said pump and motor having aligned central axes offset from and parallel to said first mentioned axes; all of said gear sets, said low-intermediate drive clutch, said high drive clutch and said output shaft all having aligned central axes offset from and parallel to said first and second mentioned axes.

8. In a power train the combination of an input shaft; an output shaft; a hydrostatic unit having an infinitely variable displacement pump and an infinitely variable displacement motor, said pump and motor having equal, positive and negative, maximum displacements; a power splitter planetary gear set having an input element and a pair of output elements; said input shaft drivingly connected to said splitter input element; drive means for continuously drivingly connecting one of said splitter output elements and said pump; a high drive clutch for locking up said power splitter planetary gear set; drive means including a low-intermediate drive clutch for drivingly connecting the other splitter output element and said output shaft; drive means including a selectively operable low drive engaging means for selectively drivingly connecting said motor and said output shaft; a power combiner planetary gear set having a pair of input elements and an output element; drive means for continuously drivingly connecting said motor and one of said combiner input elements; drive means including an intermediate-high drive clutch for drivingly connecting said input shaft and the other combiner input elements; drive means for continuously drivingly connecting said combiner output element and said output shaft; said power splitter gear set, said power combiner gear set and all of said drive means cooperating to provide an input-split-power mechanical path between said shafts and an output-split-power mechanical path between said shafts having an input speed/output speed fixed ratio less than that of said input-split-power mechanical path whereby engagement of said low drive engaging means and said low-intermediate drive clutch at zero pump displacement and maximum positive motor displacement establishes a low speed range, input-split-power drive between said shafts, engagement of said low-intermediate drive clutch and said intermediate-high drive clutch at maximum negative pump displacement and zero motor displacement establishes an intermediate speed range, compound-split-power drive between said shafts, engagement of said intermediate-high drive clutch and said high drive clutch at zero pump displacement and maximum negative motor displacement establishes a high speed range, output-split-power drive between said shafts, and the low drive engaging means and clutches are both torque unloaded and speed synchronized at their engagement when upshifting and downshifting.

9. In a power train the combination of an input shaft; an output shaft; a hydrostatic unit having an infinitely variable displacement pump and an infinitely variable displacement motor, said pump and motor having equal, positive and negative, maximum displacements; a power splitter planetary gear set having a sun gear, a ring gear and a carrier with a pinion meshing with said sun gear and said ring gear; said input shaft drivingly connected to said splitter sun gear; drive means for continuously drivingly connecting said splitter ring gear and said pump; a high drive clutch for locking up said power splitter planetary gear set; drive means including a low-intermediate drive clutch for drivingly connecting said splitter carrier and said output shaft; a power combiner planetary gear set having a sun gear, a ring gear and a carrier with a pinion meshing with said sun gear and said ring gear; drive means for continuously drivingly connecting said motor and said combiner sun gear; drive means including an intermediate-high drive clutch for drivingly connecting said input shaft and said combiner carrier; a torque-multiplier-speed reducer planetary gear set having a sun gear, a ring gear and a carrier with a pinion meshing with said sun gear and said ring gear; drive means for continuously drivingly connecting said motor and the sun gear of said torque multiplier-speed reducer gear set; the carrier of said torque multiplier-speed reducer gear set, said output shaft and said combiner ring gear all being drivingly connected; and a low drive brake for braking the ring gear of said torque multiplier-speed reducer gear set; all said gear sets and all of said drive means cooperating to provide an input-split-power mechanical path between said shafts and an output-split-power mechanical path between said shafts having an input speed/output speed/fixed ratio less than that of said input-split-power mechanical path whereby engagement of said low drive brake and said low-intermediate drive clutch at zero pump displacement and maximum positive motor displacement establishes a low speed range, input-split-power drive between said shafts, engagement of said low-intermediate drive clutch and said intermediate-high drive clutch at maximum negative pump displacement and zero motor displacement establishes an intermediate speed range, compound-split-power drive between said shafts, engagement of said intermediate-high drive clutch and said high drive clutch at zero pump displacement and maximum negative motor displacement establishes a high speed range, output-split-power drive between said shafts, and the brake and clutches are both torque unloaded and speed synchronized at their engagement when upshifting and downshifting.

10. In a power train the combination of an input member; a pair of output members; a pair of separate power path means for providing separate pairs of input-split power paths and output-split-power paths between said input member and said output members; hydraulic power transmitting means in one power path of each of said pairs of power paths for providing an infinitely vairable speed ratio drive; a pair of separate power splitter means for separately apportioning input power between the input-split power paths of said pairs of input-split power paths to provide separate input-split-power drives between said input member and said output members; and a pair of separate power combiner means for separately combining the power in the output-split power paths of said pairs of output-split power paths to provide separate output-split-power drives between said input member and said output members and also for cooperating with the associated power divider means to provide separate compound-split-power drives between said input member and said output members.

11. In a power train the combination of an input member; a pair of output members; an input drive transmitting member; drive means including a clutch for drivingly connecting said input member and said input drive transmitting member so that said input drive transmitting member is driven in one direction; drive means including a clutch for drivingly connecting said input member and said input drive transmitting member so that said input drive transmittng member is driven in the opposite direction; a pair of split-power drive means for separately drivingly connecting said input drive transmitting member and said output members; each said split power drive means comprising a hydrostatic unit having an infinitely variable displacement pump and an infinitely variable displacement motor, a power splitter planetary gear set having a sun gear, a ring gear and a carrier having a pinion meshing with said sun gear and ring gear, said splitter sun gear drivingly connected to said input drive transmitting member; drive means for continuously drivingly connecting said splitter ring gear and said pump, a high clutch for locking up said power splitter planetary gear set, drive means including a selectively operable clutch for selectively drivingly connecting said splitter carrier and one of said output members, drive means for selectively drivingly connecting said motor and said one output member, a power combiner planetary gear set having a sun gear, a ring gear and a carrier with a pinion meshing with said sun gear and said ring gear, drive means for continuously drivingly connecting said combiner sun gear and said motor, drive means including a selectively operable clutch for selectively drivingly connecting said input drive transmitting member and said combiner carrier, and drive means for continuously drivingly connecting said combiner ring gear and said one output member.

12. A method for controlling the displacements of a hydrostatic pump and motor unit in a power train providing a low speed range, input-split-power drive, an intermediate speed range, compound-split-power drive and a high speed range, output-split-power drive comprising the steps of (a) maintaining the motor at a predetermined positive motor displacement while increasing pump displacement from zero to a predetermined negative pump displacement and then decreasing motor displacement to zero while maintaining the predetermined negative pump displacement all in the low speed range, input-split-power drive, (b) increasing motor displacement from zero to a predetermined negative motor displacement while decreasing pump displacement from the predetermined negative pump displacement to zero in the intermediate speed range, compound-split-power drive, and (c) decreasing motor displacement from the predetermined negative motor displacement toward zero displacement while increasing pump displacement from zero to positive pump displacement.

13. A method for controlling a hydrostatic pump and motor unit in the power train providing a low speed range, input-split-power drive, an intermediate speed range, compound-split-power drive and a high speed range, output-split-power drive wherein the pump and motor have equal, positive and negative maximum displacements comprising the steps of (a) maintaining maximum positive motor displacement while increasing pump displacement from zero to maximum negative pump displacement and then decreasing motor displacement to zero while maintaining maximum negative pump displacement all in the low speed range, input-split-power drive, (b) increasing motor displacement from zero to maximum negative motor displacement while decreasing pump displacement from maximum negative pump displacement to zero in the intermediate speed range, compound-split-power drive, and (c) decreasing motor displacement from maximum negative motor displacement toward zero motor displacement while increasing pump displacement from zero toward maximum positive pump displacement.

References Cited

UNITED STATES PATENTS

| | | | |
|---|---|---|---|
| 2,377,354 | 6/1945 | Merritt | 74—720.5 X |
| 2,930,257 | 3/1960 | Christenson | 74—720.5 |
| 3,199,376 | 8/1965 | DeLalio | 74—720.5 |
| 3,306,129 | 2/1967 | DeLalio | 74—687 |
| 3,383,952 | 5/1968 | Christenson | 74—720.5 |

ARTHUR T. McKEON, Primary Examiner

U.S. Cl. X.R.

74—687

PO-1050
(5/69)

UNITED STATES PATENT OFFICE
CERTIFICATE OF CORRECTION

Patent No. 3,470,769      Dated October 7, 1969

Inventor(s) William G. Livezey

It is certified that error appears in the above-identified patent and that said Letters Patent are hereby corrected as shown below:

Column 2, lines 49 and 50, delete "engaged intermediate-high clutch and the hydraulic power from the". Column 3, line 33, "folowing" should read -- following --; line 51, "suitablr should read -- suitable --; line 75, "conected" should read -- connected --. Column 4, line 55, "drivers'" should read -- drives' --. Column 6, line 24, "defiined" should read -- defined --; line 47, "direction" should read -- directions --. Column 7, line 43, after "being insert -- a --. Column 8, lines 53 to 55, "$\frac{N_i}{g_i}$ $(0 < N_0 < \frac{N_i}{g_i})$" should read -- $\frac{N_i}{g_i}$ $(0 < N_0 < \frac{N_i}{g_i})$ --. Column 9, line 57, "$N_{igi}$" should read -- $N_i/g_i$ --. Column 11, line 24, "more" should read -- move - line 28, "exist" should read -- exists --; line 30, "the" shou read -- this --. Column 12, line 17, "intermedaite" should re -- intermediate --; line 48, "$(P_{go} = 1)$" should read -- $(P_{g_o} = 1)$ --; line 69, "$1/g_o$" should read -- $1/g_o$ --; line 71, "shaf t39" should read -- shaft 39 --; line 74, after "output" insert -- speed --; line 75, "$1_{g_p}$" should read -- $1/g_p$ --. Column 13, line 24, after "at" insert -- the --; line 42, "$T_{g_0}$" should read -- $T_{g_o}$ --; line 44, "maximu" should read -- maximum --. Column 16, line 65, "out-split-power" should read -- output-split-power --. Column 17, line 21, "divider" should read -- combiner --. Column 18, line 53, "elements" should read -- element --. Column 19, line 59, "vairable" should read -- variable --. Column 20, line 7, "transmittng" should read -- transmitting --; line 56, "the" should read -- a --.

SIGNED AND
SEALED

MAY 26 1970

(SEAL)
Attest:

Edward M. Fletcher, Jr.
Attesting Officer

WILLIAM E. SCHUYLER, JR.
Commissioner of Patents